Mar. 13, 1923.
C. G. LUNDHOLM
BOX MAKING MACHINE
Filed July 16, 1921
1,448,412
6 sheets-sheet 3
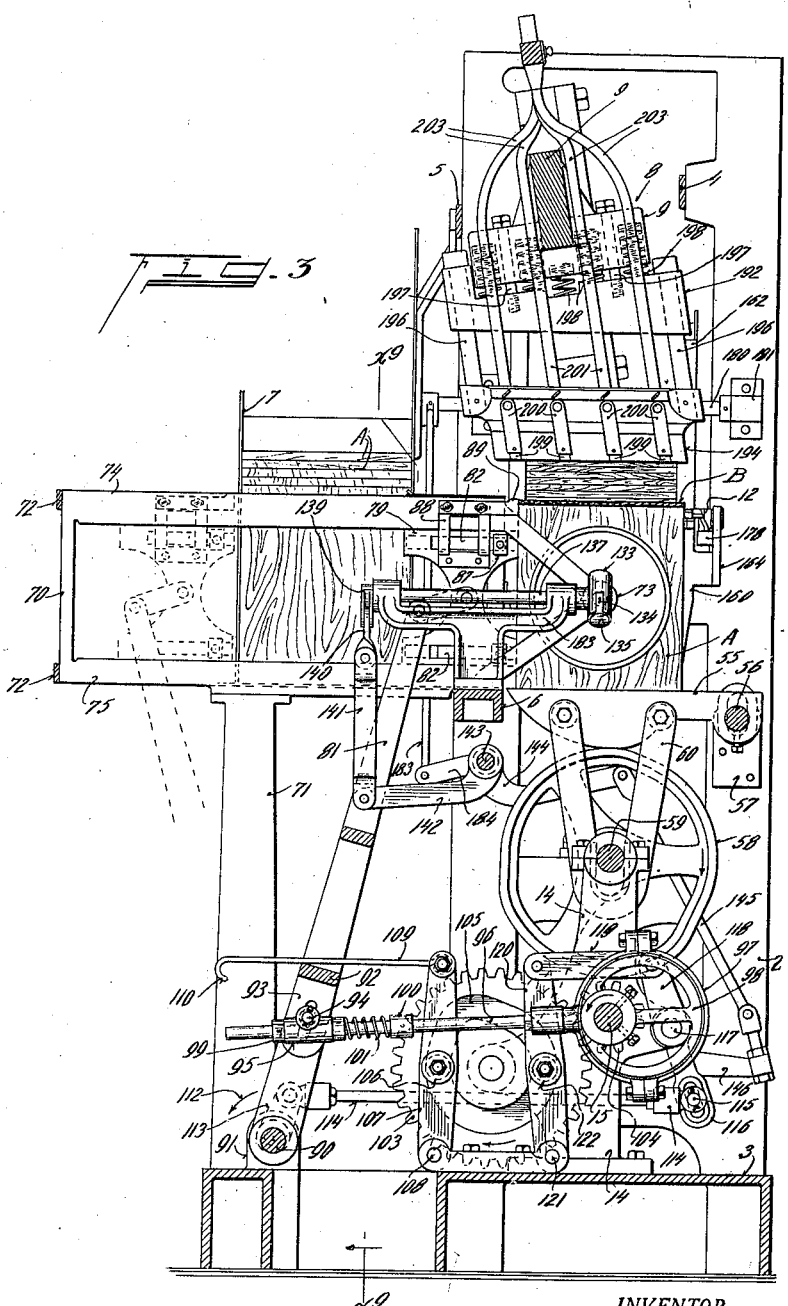

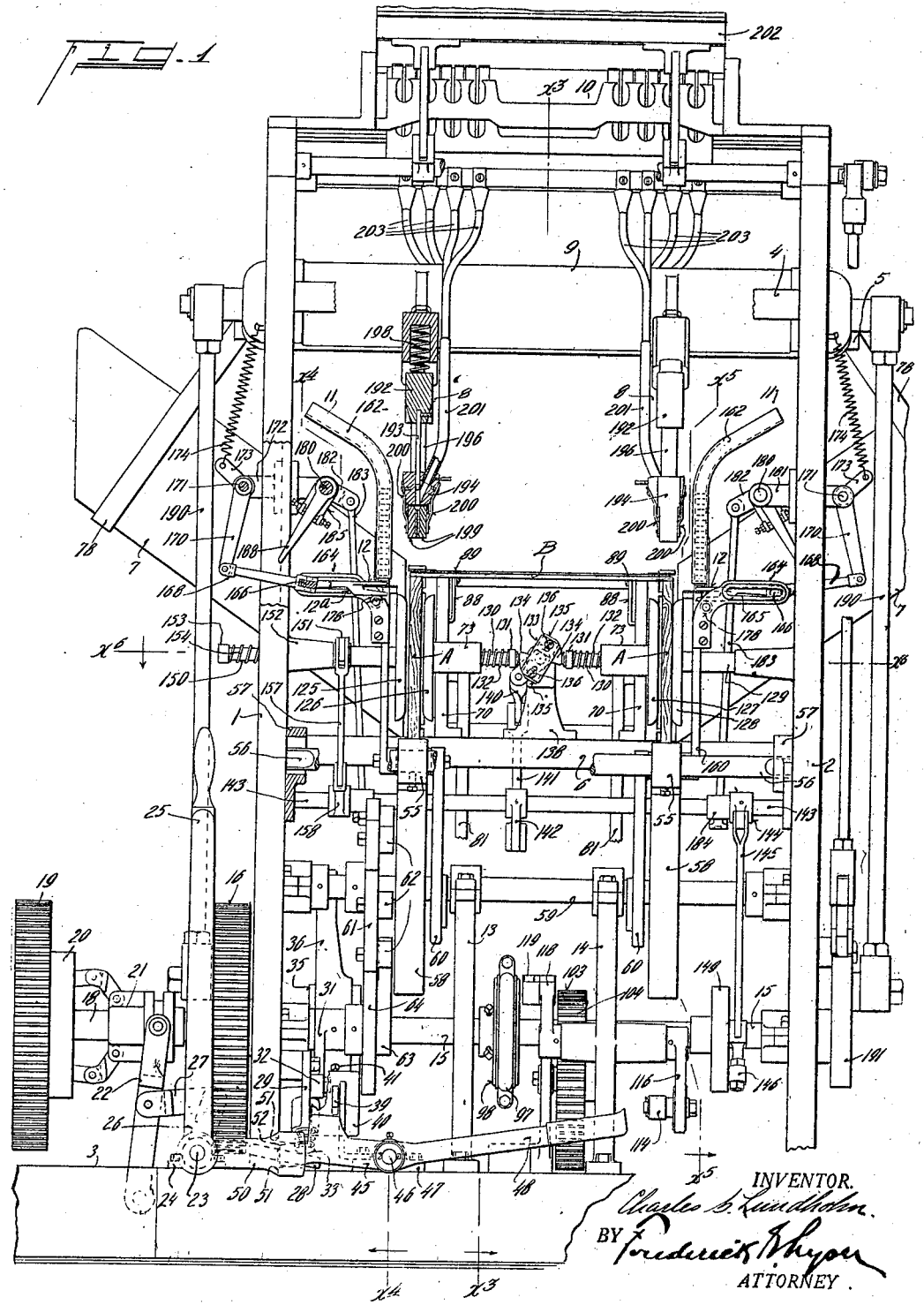

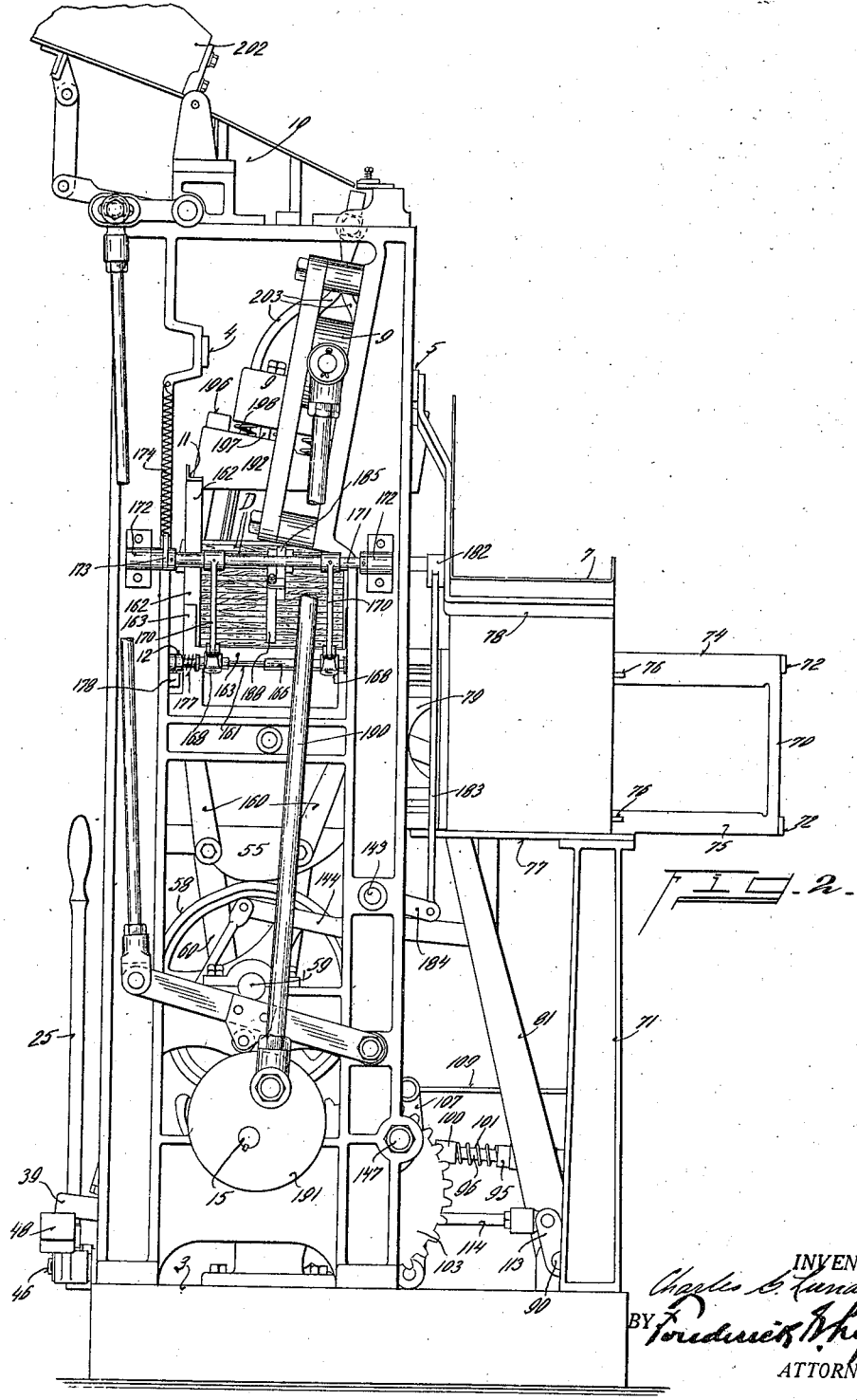

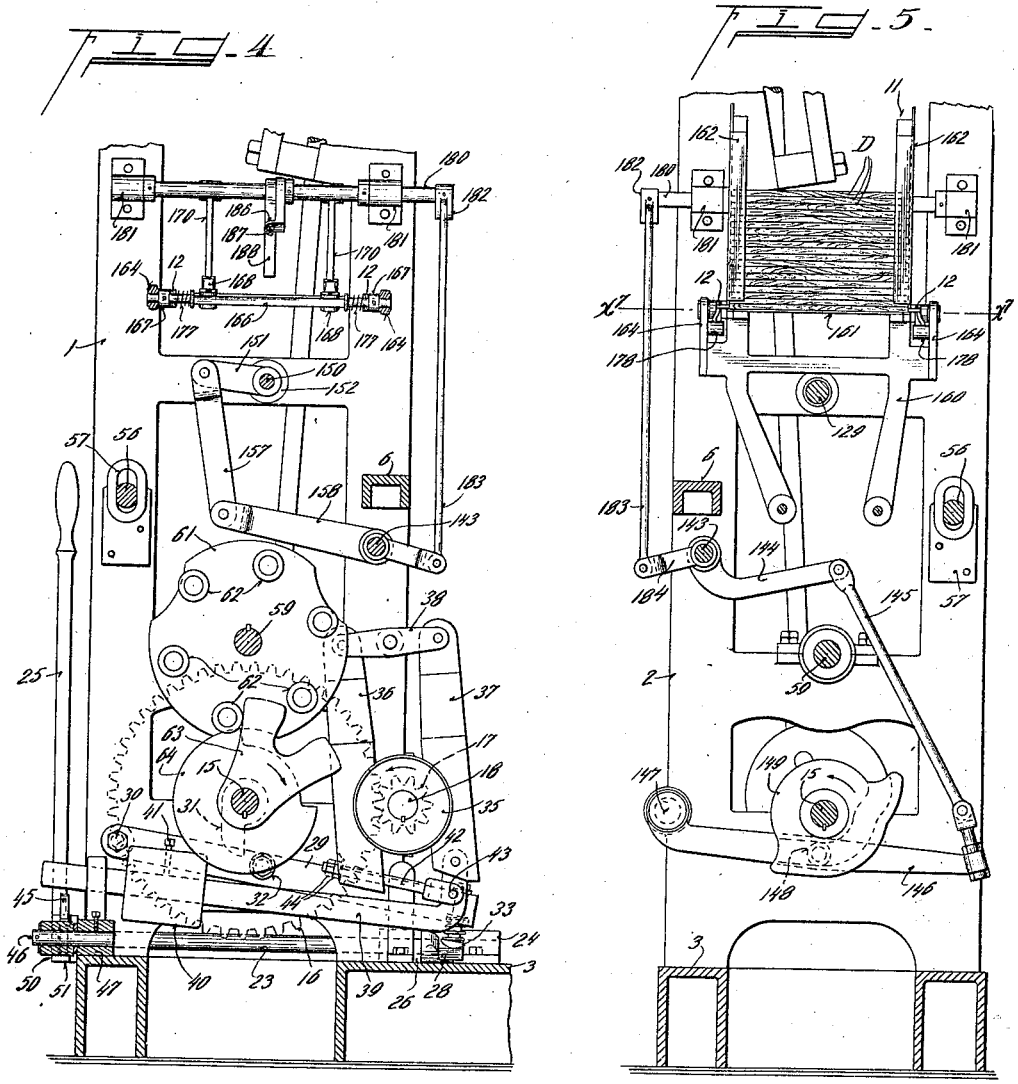

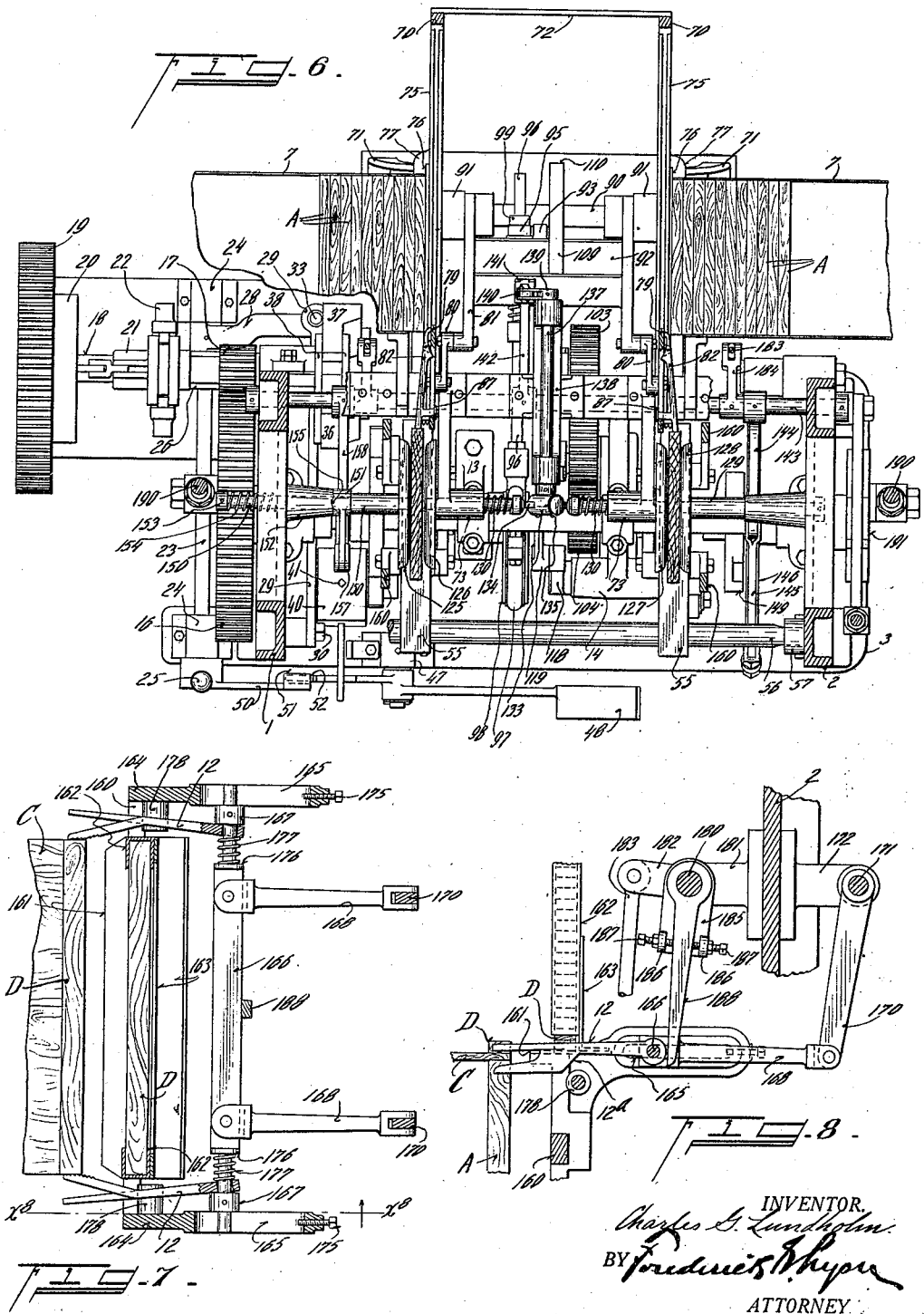

Mar. 13, 1923.
C. G. LUNDHOLM
BOX MAKING MACHINE
Filed July 16, 1921
1,448,412
6 sheets-sheet 6
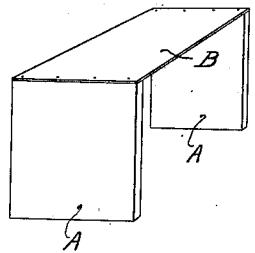
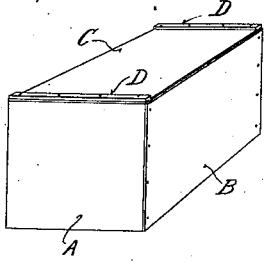
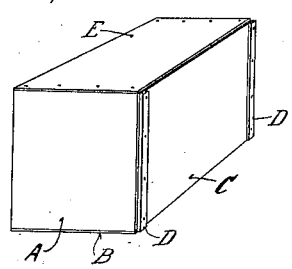
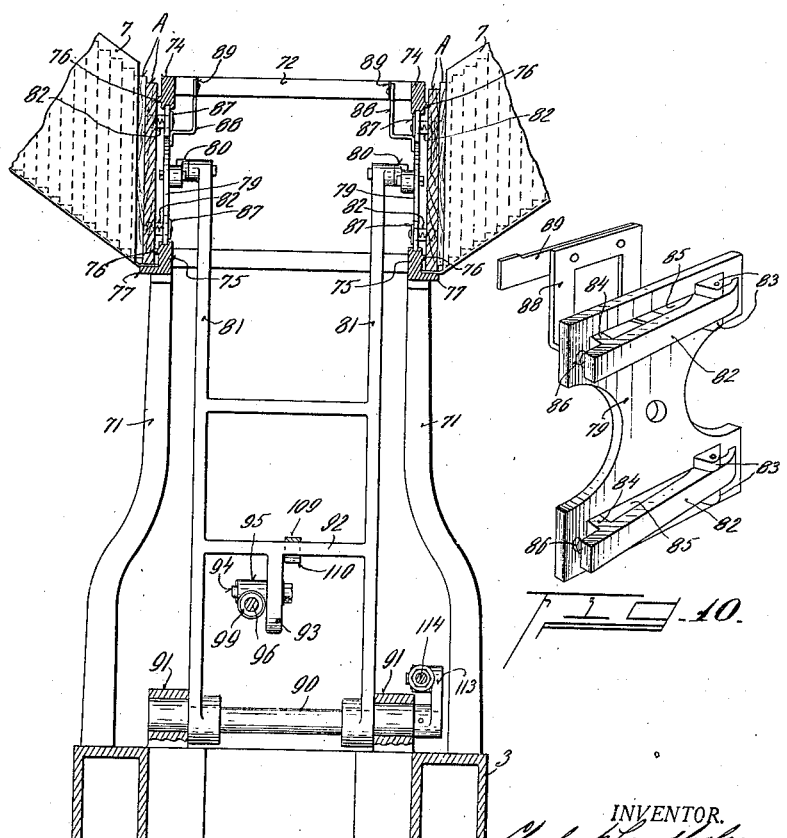
INVENTOR.
Charles G. Lundholm
BY Frederick Whyon
ATTORNEY Patented Mar. 13, 1923.

1,448,412

UNITED STATES PATENT OFFICE.

CHARLES G. LUNDHOLM, OF SAN BERNARDINO, CALIFORNIA.

BOX-MAKING MACHINE.

Application filed July 16, 1921. Serial No. 485,269.

*To all whom it may concern:*

Be it known that I, CHARLES G. LUND-HOLM, a citizen of the United States, residing at San Bernardino, in the county of San Bernardino and State of California, have invented a new and useful Box-Making Machine, of which the following is a specification.

This invention relates to box making machines and is particularly directed to a machine operated to perform a series of successive steps in the manufacture of a box.

The object of the invention is to provide a machine for making a box and attaching cleats to the bottom thereof simultaneously with the nailing of the bottom to the box ends.

Another object to provide a machine for making a box having rectangular ends.

Another object is to provide a machine for making a box in three successive steps or machine operations, the first of these steps attaching the boards of one side of the box to the box ends, the second simultaneously attaching transverse cleats and the bottom boards to the box ends and the third attaching the boards of the opposite side of the box to the box ends.

Another object is to provide a machine having automatic nailing devices and means for supporting the box at different elevations during each nailing operation in the formation of each box.

Another object is to provide a machine having automatic nailing devices and means for automatically feeding box ends into cooperative alignment therewith at timed intervals in the sequence of nailing operations and to provide control means for varying the operation of the feeding means so that box ends are fed only once during the formation of each box and so that between each feeding of the box ends said feeding mechanism will permit the position of the box ends to be modified.

Another object is to provide a machine having clutch and brake devices whereby the machine may be controlled to stop after each nailing operation or to have a continuous operation.

Various other objects and advantages will be more fully apparent from the following description of the accompanying drawings, which form a part of this disclosure, and which illustrate a preferred form of embodiment of the invention.

Of the drawings:

Figure 1 is a front elevation of the machine.

Fig. 2 is a right side elevation.

Fig. 3 is a central vertical section on line $x^3$—$x^3$ of Fig. 1.

Fig. 4 is a vertical section on line $x^4$—$x^4$ of Fig. 1.

Fig. 5 is a vertical section on line $x^5$—$x^5$ of Fig. 1.

Fig. 6 is a plan section on line $x^6$—$x^6$ of Fig. 1.

Fig. 7 is an enlarged detail plan section on line $x^7$—$x^7$ of Fig. 5.

Fig. 8 is a vertical section on line $x^8$—$x^8$ of Fig. 7.

Fig. 9 is a vertical section on line $x^9$—$x^9$ of Fig. 3.

Fig. 10 is an enlarged detailed perspective view of one of the box end feeding slides.

Fig. 11 is a perspective view of a partially completed box showing one side board nailed to the box ends, as the first step in the sequence of operations.

Fig. 12 is a similar perspective view showing the box turned to bring the bottom edges of the box ends upward and showing the bottom board and the cleats nailed to the box ends, as the second step in the sequence of operations.

Fig. 13 is a similar perspective view showing the box again turned and the other side boards nailed to the box ends to complete the box, as the third step in the sequence of operations.

The machine illustrated in the drawings is designed for the manufacture of boxes to be used for packing fruits, particularly apples, and as it is desirable that such boxes be of unequal height and width, in the present instance a height of ten inches and a width of eleven inches, the operations of the mechanisms which align and support the box ends in their several positions are modified throughout the sequence of machine operations so that the box ends will properly align with the nailing devices in each of their three positions with their uppermost edges positioned at a proper elevation relative to the uniform stroke of the nailing devices, These boxes have transverse cleats attached to the bottoms in alignment with the end boards, these cleats serving to reinforce the box and also as means for separating the boxes from the floor or other surface upon which they are placed and from each other when stacked so as to permit a circulation of air beneath the boxes and through the stack of boxes.

In the making of a box by the machine of the present invention, the two box ends are fed into the machine to positions of cooperative alignment with suitable reciprocating nailing heads and the board or boards which form one side of the box are manually placed upon the box ends. The box ends are held rigidly in place during the operation of the nailing heads which attach said boards to the box ends in the first step in the formation of the box. The partially completed box is next manually turned towards the operator to bring the bottom edges of the ends uppermost and the board or boards which form the bottom of the box are manually placed in position. The machine is again operated and in this operation the cleats are automatically positioned on top of said bottom board in alignment with the respective end boards and the nailing heads operated to simultaneously nail said cleats and board to the ends. The box is again turned and the board or boards which form the remaining side of the box are manually placed in position and during the next operation of the nailing heads is nailed to the box ends completing the maufacture of the box.

The machine includes a suitable nail hopper and nail picking device of the type illustrated and described in my prior Patent No. 1,108,594, dated August 25, 1914, and also includes nailing devices of the same general type as illustrated and described in the Patent No. 817,509 to E. E. Northrup, dated April 10, 1906. In view of the disclosures in these patents it will not be necessary in the present specification to particularize as to the specific constructions or operations of these mechanisms except in so far as such description will facilitate a clear understanding of the present invention.

*General construction.*—Right and left hand side frames 1, 2 extend upwardly from a base 3 and are maintained in spaced relation by transverse brace bars 4, 5 and by a channel member 6. At the rear of the machine are two opposed magazines, 7, 7 in which are stacked the supply of box ends and suitable feeding means are provided for progressively feeding one of said ends from each magazine into the machine at timed intervals. The nailing heads, indicated generally by the reference characters 8 are carried by a reciprocatory cross-head 9 and the nail feeding mechanism, indicated generally by the reference character 10, is mounted across the tops of the side-frames 1, 2. Positioned adjacent the box ends when they are in position in the machine, are cleat hoppers 11, 11, each containing a stack of cleats and cleat feeding pawls 12, 12 function at timed intervals to eject the bottom cleat from each stack and position it to be subsequently nailed to the box.

*Main drive, clutch and brake mechanism.*—The main drive shaft 15 of the machine is rotatably journaled in bearings in the side-frames, and in intermediate upright brackets 13, 14 and adjacent the outer side of the side-frame 1 has fixed thereto a drive gear 16. Said gear meshes with a pinion 17 fixed to a clutch shaft 18 (see Figs. 4 and 6) which is journaled in a bearing in the side-frame 1 and at its opposite end in any suitable form of supporting bracket (not shown). A main drive element 19 is illustrated as a gear which may be driven by electric motor or any other power element and is loosely journaled on the clutch shaft 18. Any of the many well known types of clutch mechanism may be employed for clutching the drive element to the clutch shaft, the drawings herein illustrating such mechanism in a general way as including a clutch drum 20 fixed to the gear 19 and housing a suitable clutch mechanism (not shown) which mechanism is adapted to be operated by a sliding sleeve 21 loose on the clutch shaft 18 and translated away from the machine to function the clutch and towards the machine to release the clutch. A clutch operating member 22, shown as a yoke lever engaging a peripheral groove in the sleeve 21 functions to manipulate the clutch. Various standard types of clutches other than that shown will be equally adaptable for the purposes intended as will be well understood.

A horizontal rock shaft 23 is journaled in bearing blocks 24 fixed on the base 3 and has fixed to its forward end a hand lever 25, while near its opposite end an arm 26 is fixed to said shaft and is connected by a link 27 with the clutch operating member 22. (See Figs. 1–4–6). It will be evident that the hand lever may be manually operated to clutch or unclutch the power drive.

Means are provided for automatically throwing out the clutch at the end of each complete revolution of the main drive shaft 15, such means including an arm 28 fixed to the rock shaft 23 near its rearward end and extending inwardly beyond the side-frame 1, a lever 29 pivotally supported at 30 on the inner surface of the side-frame 1, and a cam 31 fixed to the main drive shaft 15. A cam roller 32 carried by the lever 29 is adapted to be moved into the path of the cam 31, and the rearward end of the lever 29 carries a vertically disposed spring plunger 33 engaging the inner end of the arm 28. (See Figs. 1 and 4). By shifting the hand lever 25 to the left (see Fig. 1) the rock shaft 23 is rocked to throw in the clutch and the arm 28 by its rocking movement elevates the free end of the lever 29 thereby bringing the roller 32 carried by said lever into the path of the cam 31. During the operation of the machine the cam 31 makes one revolution and then engages the roller 32 and depresses the lever 29 which through the spring plunger 33 and the arm 28 will rock the shaft 23 to release the clutch and disconnect the power. If, however, a continuous operation of the machine is desired, the hand lever 25 may be forcibly retained in its shifted position to the left, and in this case the cam 31 will engage the roller 32 and depress the lever 29 as before, but during such depression the spring plunger 33 will absorb such movement without rocking the arm 28, and until the hand lever 25 is relieved of restraint the machine will continue to operate.

A brake mechanism operates in unison with the clutch mechanism for the purpose of arresting the momentum of the machine, and includes a brake pulley or drum 35 fixed to the clutch shaft 18 just inside of the side-frame 1 and two opposed brake arms 36—37 pivotally supported on opposite ends of a link member 38 pivoted on the side-frame. The inner surface of each brake arm is contoured to fit the peripheral surface of the brake drum and the lower end of the arm 37 pivotally supports a brake operating lever 39 which extends forwardly and has a weight 40 slidable thereon and provided with a set screw 41 by which the weight is clamped on the lever in adjusted position. Connecting the lever 39 with the brake arm 36 is a bolt 42 having a rear bifurcated end pivotally connected at 43 to the lever 39 with its forward end extended through a bore in the arm 36 and provided with adjusting nuts 44 by which the brake pressure may be regulated. The forward end of the brake lever 39 extends over and is in the path of movement of a brake release arm 45 journaled on a stud 46 which is secured in a supporting block 47 fixed on the base of the machine. The arm 45 has an extension 48 forming a foot lever by which the clutch and brake mechanisms may be operated when desired. The hand lever 25 has a lateral extension 50 having relatively spaced horizontal ears 51 and the arm 45 has a nose 52 projecting between said ears, said nose having curved surfaces cooperating with the ears 51 in the manner of gear teeth so that the hand lever 25 and the foot lever 48 will always move in unison.

It will be evident from the above that whenever the clutch is thrown in by movement of the hand lever 25 or the foot lever 48, the arm 45 will raise the forward end of the brake lever 39 and cause a spreading apart of the brake arms 36—37 to release the clutch shaft 18, and that when said levers are reversely moved to throw out the clutch the arm 45 will be lowered to allow the weight 40 to force the brake lever 39 downward thereby drawing the brake arms 36—37 together to grip the brake drum 35 and arrest the momentum of the machine. This provides a dual control for the clutch and brake devices.

*Box supporting table.*—In the making of a box the box ends A are fed from the magazines 7—7 and onto a table to the positions shown in Figs. 1-3-6 and when in the first of the three positions they occupy during the forming of the box said ends will rest on their side edges, as shown in Fig. 3. In this position the opposite side edges of the box ends are at a suitable elevation for cooperation with the nailing heads 8 which during a first operation of the machine attach the side board B to the ends as a first step in the sequence of operations. Prior to a second operation the box ends A and the attached side board B, as a partially formed box, is manually rotated, in clockwise direction in Fig. 3, bringing the bottom edges of the box ends A uppermost. The board C (see Fig. 12) which is to form the bottom of the box is placed upon the box ends and an automatic mechanism hereinafter to be described feeds cleat strips D upon the bottom board C, the board and cleats to be attached simultaneously by the same nails in the subsequent operation of the nailing heads, but as the box ends have a lesser dimension of depth than of width the partially completed box must be raised to bring the top surfaces of the cleats to a suitable elevation for proper cooperation with the nailing heads during the second operation of the machine. Prior to the third step in the sequence of machine operations the partially completed box is again manually rotated and positioned with the side board B downwardly and resting on the table. This requires that the box again be lowered but not to the same level as in the first step because the attached side B gives the box a greater width than in the first step, therefore the table is lowered below its first position a distance equal to the thickness of the side board B. The board E is then placed in position and the machine operated to attach said side board E to the box ends to complete the box. Figs. 11 to 13 illustrate the three steps in the box forming operation with each showing the box in the relative positions it occupies during each succeeding step.

Considering the above sequence of operations it will be evident that the table or other box supporting elements must be elevated and lowered to different elevations during the series of machine operations.

With particular reference to Figs. 1-3-6, the box supporting elements of the present machine are two relatively spaced table blocks 55 each fixed to a horizontal tie rod 56 extending across the front of the machine with the ends of the rod vertically slidable in guide brackets 57 secured to the inner surfaces of the opposed side-frames. These table blocks being joined in an integral unit function the same as would a one-piece table of suitable width and such a one-piece table could be provided if desired, therefore, in the description to follow the term table will be understood to include both table blocks 55 and the tie rod 56. The lower surface of each table block 55 rests upon the periphery of an elevator cam 58 on a shaft 59 which is journaled in bearings in the side-frames and in the brackets 13—14, and the blocks are further guided in their vertical movements by guide yokes 60 each attached to the inner side of the companion block and extended downwardly to embrace the opposite sides of the shaft 59. (See Fig. 3.) The cams 58 are of duplicate contour formed to properly vary the elevation of the table blocks 55 during each one-third revolution of the shaft 59 and said shaft is rotated one-third of a revolution during each operation of the machine by mechanism illustrated in Figs. 1 and 4. This mechanism includes a plate 61 fixed to the shaft 59 and carrying a plurality of relatively spaced anti-friction rollers 62, and a forked arm 63 fixed on the main shaft 15 and adapted to engage the rollers 62 during each revolution of said main shaft and rotate the shaft 59 one third of a revolution. At points relatively spaced 120 degrees the periphery of the plate 61 is cut to register with the periphery of an aligning disc 64 which is fixed on the shaft 15 and has a cutaway portion providing clearance for the rotation of the plate 61. With the mechanism in the position shown in Fig. 4 and with the main shaft 15 rotating in the direction of the arrow, the shaft 59 will be maintained stationary throughout a greater portion of the revolution of the shaft 15 and during the final portion of said revolution the forked arm 63 engaging the rollers 62 will rotate the plate 61 and shaft 59 one third of a revolution. This mechanism and the elevator cams 58 function to vary the elevation of the table blocks during each operation of the machine and to hold said table blocks stationary at each elevation throughout the greater portion of each operation and during each operation of the nailing heads.

*Feeding mechanism.*—As best shown in Figs. 3, 6, 9, the mechanism for feeding the box ends into the machine is carried by a framework located at the central rear portion of the machine and such framework comprises two relatively spaced substantially rectangular shaped frames 70 of duplicate construction vertically disposed in parallel relation with their forward ends resting on and attached to the channel 6 and their rear portions resting on and attached to legs 71 extending upwardly from the base 1. The rear ends of the frames 70 are connected by cross bars 72 and their forward ends terminate with horizontal bearings 73 which accommodate parts of the box clamping mechanism to be later described. Each frame 70 has an upper horizontal rail 74 and a lower horizontal rail 75 each rail having a longitudinal rib 76 projecting laterally from its outer surface, said ribs serving as abutments against which the first box end in each magazine engages, and as means for guiding the box ends in their forward travel. The lower end of the bottom wall of each of the magazines 7, 7 terminate with a horizontal portion resting upon a lateral ledge 77 projecting from the respective rail 75 and the upper end of each magazine is supported by a bracket 78 having its upper end attached to the brace bar 5. With particular reference to Figs. 6 and 9, it will be noted that the forward vertical wall of each magazine extends only to a point for engagement with the second box end of the stack in the magazine, leaving the first box end of said stack free to be propelled forward by the feeding devices while restraining the remainder of the stack against lateral movement, thereby permitting the box ends to be singly engaged and fed forward into the machine. The upper surface of each rail 75 and the lower surface of each rail 74 are longitudinally grooved, and slidable in each pair of grooves is a slide 79 with each slide connected by a link 80 with the upper end of an oscillatory slide operating yoke 81 so that as the yoke is oscillated the slides are reciprocated in their respective slideways. Each slide 79 (see Fig. 10) supports two pawls 82 each pivoted between laterally extending ears 83 and having a lateral limb 84 projecting through a longitudinal slot 85 in the slide. Between the slide and the forward end of each pawl is a spring 86 yieldingly maintaining the pawl in normal position and attached to the limb 84 on the opposite side of the slide is a stop plate 87 which is too large to pass through the slot 85 and serves to limit the outward movement of the pawl. The rear end of each pawl engages the side of the slide and assists in limiting the outward movement of the pawl.

With particular reference to Figs. 3, 6, it will be understood that as the slides are retracted the outer surfaces of the pawls will engage the surfaces of the first end board in each stack in the respective magazines and the pawls will be rocked on their pivots during such retractive movement. When the slides are retracted sufficiently to bring the forward ends of the pawls past the rear edge of said first end boards (to the approximate position indicated in dotted lines in Fig. 3) the spring 86 will normalize the pawls whereupon, with the succeeding forward reciprocation of the slides said pawls will engage and translate said respective end boards into the machine.

Mounted on the inner surface of each slide 79 is a bracket 88 and longitudinally adjustable on each bracket is a stop finger 89 located at an appropriate height to be engaged by the side or bottom boards which are to be nailed to the end boards and serving as gages to facilitate a correct positioning of said side and bottom boards.

The slide operating yoke 81 oscillates freely on a shaft 90 and said shaft is eccentrically journaled in bearings 91 on the base 3, the reason for this particular mounting of the shaft being later explained. Depending from the lower transverse web 92 of the yoke 81 is an arm 93 supporting a stud 94 and upon said stud is loosely journaled a swivel block 95 which is bored at right angles to the plane of the stud to receive an eccentric rod 96. On the forward end of the rod 96 is an eccentric strap 97 surrounding an eccentric disc 98 which is fixed to the main shaft 15 and fixed on the rod 96 are two relatively spaced collars 99 and 100, the collar 99 engaging the rear surface of the swivel block 95 and the collar 100 being engaged by a coil spring 101 surrounding the rod and engaging the forward surface of the swivel block 95. With this arrangement the eccentric rod will be translated a full stroke in each direction during each revolution of the main shaft and will at the same time oscillate the slide operating yoke 81, the tension of the spring 101 being strong enough to transmit the full rearward movement to the yoke unless said yoke is held against movement, in which case the spring 101 absorbs such portion of the movement as is not transmitted to the yoke.

As previously explained the box ends are fed into the machine during every third operation, therefore, for the reason that the yoke 81 is oscillated during every machine operation some means must be provided to prevent a full retractive stroke of the feeding slides 79 during the two intermediate strokes so that the pawls 82 of the slides will not engage in rear of the box ends in the magazines during these intermediate strokes. The mechanism employed for this purpose includes a gear 103 which is rotatively journaled on a stud carried by the bracket 14 and which meshes with a pinion 104 fixed on the main shaft 15. The inner surface of the gear 103 is cut to provide a cam groove 105 and projecting into said groove is an anti-friction roller 106 which is carried by a rock lever 107. The lever 107 is pivoted at 108 on the base of the machine and to its upper end is pivoted an arm 109 which extends rearwardly and rests upon the web 92 of the yoke 81 with its free end turned downwardly to form a hook 110 in the path of movement of the web 92. The ratio of the gear 103 and pinion 104 is one to three therefore the gear 103 will be given one complete revolution in each sequence of three machine operations and the cam groove 105 is formed to move the arm 109 to the limit of its rearward movement during one-third of the revolution of the cam gear 103 and to maintain said arm in its forward position during the other two-thirds of said revolution. In operation this device permits a full rearward stroke of the feeding yoke 81 during one-third revolution of the cam gear 103 or during one machine operation in which the box ends are fed into the machine and during the remaining two-thirds revolution of the cam gear 103 or during the two succeeding machine operations the hooked end 110 of the arm 109 is held in the forward position shown in Fig. 3 and is engaged by the web 92 of the yoke 81 serving as an abutment to limit the retractive movements of said yoke so that the feeding slides 79 will be reciprocated without feeding box ends into the machine. During such interrupted retraction of the yoke the spring 101 will absorb the untransmitted portion of the throw of the eccentric rod 96.

In the first step in the making of the box the box ends are positioned on the table with their greater dimensions vertically disposed in proper alinement with the nailing heads, as shown in Figs. 1 and 3, and in the second step the box ends are turned so that their greater dimensions are horizontally disposed. It will be evident that when the box ends are in the horizontal position on the table they extend further backward when alined with the nailing heads than they do when in their first position and also will it be evident that if the feeding slides 79 are moved forward during their second forward stroke the alining of the box with the nailing heads would be impossible as the slide pawls 82 would prevent the box ends from being manually moved rearward far enough. It is therefore required that the first non-feeding forward stroke of the slides 79 be shortened so that they come to rest at a proper position to permit the box to assume its second position with the pawls 82 in this instance acting as gage abutments to determine the position of the partially completed box. The second non-feeding forward stroke of the slides 79 is of the initial full stroke length to position the pawls 82 as in the first instance, to serve as gage abutments for the box ends which in the third and final step are again vertically disposed.

To provide for this variation in the forward stroke of the feeding yoke 81 I utilize a mechanism which cooperates with the eccentrically journaled shaft 90 previously described. With particular reference to Fig. 3, it will be noted that if the shaft 90 is turned in the bearings 91 in the direction of the arrow 112, the medial eccentrically disposed portion of the shaft which supports the yoke 81 will be moved forwardly and will slightly rock said yoke about the stud 94 as a pivot thereby shortening the forward stroke of the yoke. This operation is performed in unison with the forward pull of the eccentric rod 96 so as to produce a smooth unbroken movement of the yoke. To rock the shaft 90 I provide an arm 113 which is fixed to one end thereof and pivotally connected to said arm is a forwardly extending link 114 pivotally journaled on a stud 115 carried by a rocker arm 116. The stud 115 is radially adjustable in an elongated slot in the arm 116 so that the degree of rocking movement imparted to the shaft 90 may be regulated to determine the variation of the throw of the yoke. The arm 116 is secured to a short shaft 117 journaled in the bracket 14 and having an upwardly extending arm 118 secured to its opposite end (see Fig. 1). A link 119 is pivotally connected to the arm 118 and to the upper end of an arm 120 which is pivoted at 121 on the machine base and carries an antifriction roller 122 projecting into the cam groove 105 of the cam gear 103. With this structure it will be understood that as the cam gear 103 rotates and rocks the arm 120 the shaft 90 will be rotated to vary the forward throw of the yoke 81.

*Box clamping mechanism.*—After the box ends or the partially completed box is positioned upon the table and during each operation of the nailing heads, said ends must be rigidly held in place and then released at the end of each machine operation so the partially completed box may be manually turned. By inspection of the drawings, particularly Figs. 1 and 6, it will be noted that the left-hand box end A is positioned between circular disks 125—126 and the right-hand box end A positioned between circular disks 127—128. These are clamp elements which function to clamp the respective end boards and hold them rigid during the nailing operations. The disk 128 is rigidly secured to a stud 129 supported on the side-frame 2. The disks 126—127 are secured to the outer ends of shafts 130—130, each shaft being slidably supported in the bearings 73 of the respective frames 70 with their inner ends relatively spaced apart. Near the inner end of each shaft 130 is a fixed collar 131 and surrounding each shaft between said collar and the respective bearing 73 is a coil spring 132, said springs normally retaining the disks 126—127 out of engagement with the end boards A. Positioned between the inner ends of the shafts 130 is a spreader cam element 133 having two opposed eccentric cam projections 134—134 normally engaging the respective shafts 130 and opposed plug members 135—135 carried in the opposite ends of a transverse bore in the spreader 133 with their outer ends forming continuations of the cam projections 134. These plug members are adjustable relative to each other and are clamped in adjusted positions by screws 136—136 extending through elongated slots in the spreader 133 and screw-threaded into the plug members. (See Fig. 1). The spreader 133 is fixed to the forward end of a horizontal shaft 137 and the shaft 137 is journaled in bearings in a bracket 138 fixed on the channel 6. By a rocking of the shaft 137 the spreader 133 is turned to force the shafts 130 apart and cause the disks 126—127 to clampingly engage the end boards A. The arm 139 (see Fig. 3) is secured to the rear end of the spreader shaft 137 and is connected by two links 140—141 with the end of an arm 142 fixed on a main rock shaft 143. The shaft 143 is journaled in suitable bearings in the side-frames of the machine and is rocked at timed intervals by an arm 144, (see Fig. 5), said arm being connected by a link 145 to the forward end of a cam lever 146 pivotally supported at 147 on the side frame 2. An antifriction roller 148 carried by the lever 146 cooperates with a cam 149 fixed on the main shaft 15, said cam being partly an enclosed cam and partly an open cam. During the operation of the machine the lever 146 functions through the connecting link 145 and arm 144 to rock the shaft 143. The disk 125 is carried by a shaft 150 having an end portion of reduced diameter which extends through the hub of an arm 151 and is slidably supported in a bearing 152 on the side-frame 1. Fixed on the outer end of the shaft 150 is a collar 153 and between the side-frame 1 and the collar 153 is a coil spring 154 surrounding the shaft and yieldingly maintaining the disk 125 away from the adjacent end board A. The arm 151 is loose on the shaft 150 and has a cam tooth 155 normally meshing into a companion notch on the bearing 152, the opposite surface of the arm 151 bearing against the shoulder formed by the reduced portion of the shaft 150. A rocking of the arm 151 will cause its cam tooth 155 to ride out of the companion notch to effect an inward translation of the shaft 150 and bring the disk 125 into clamping engagement with the end board A. (See Fig. 6). The forward end of the arm 151 is connected by a link 157, to an arm 158 which is secured to the main rock shaft 143. (See Fig. 4).

The above described mechanism functions to simultaneously urge the disks of each pair towards each other to clamp the box ends A and maintain them rigid during each nail driving operation.

*Cleat feeding mechanism.*—The two cleat hoppers 11 and the associated cleat feeding mechanisms are of duplicate construction and operation, therefore a description of one will herein suffice for a clear understanding of both. A vertically disposed H-shaped frame 160 has its lower limbs secured to the outer side surface of the respective table block 55 and is vertically movable therewith as an integral unit. (See Figs. 1–2–5). Upon the upper surface of the frame 160 is a horizontal plate 161 forming the base of the cleat hopper 11 which comprises two opposed channel irons 162—162 vertically disposed above the base plate 161 with their lower ends spaced from said plate a distance greater than the thickness of one cleat but not equal to the thickness of two cleats (see Figs. 7 and 8). The channel irons 162—162 are supported above the base plate 161 by an angle iron 163 attached to said channel irons and to the plate and extending across the hopper. The cleats D are fed into the upper end of the hopper and rest in superposed relation on the base plate, the cleats being automatically ejected one at a time from the bottom of the stack.

The upper surface of the base plate 161 is spaced above the surface of the table block 55 a distance which positions it slightly above the bottom board C of the box when the end boards A are positioned on the table with their longer dimensions horizontal, or at an elevation above the table slightly greater than the lesser dimension of a box end plus the thickness of the bottom board, so that an ejected cleat D will be positioned upon the bottom board C of the box. This is well illustrated in Fig. 8 which shows the cleat feeding mechanism in operated position positioning the cleat upon the bottom board of the box. Guide brackets 164—164 having relatively aligned horizontal slots 165—165, are attached to the opposite edges of the frame 160 and slidable in said slots is a feed bar 166 carrying fixed collars 167, 167 engaging the brackets to prevent axial displacement of the bar. The medial portion of the bar 166 is rectangular in cross section and vertically pivoted to said medial portion are two links 168, 168 extending outwardly beyond the side-frame. The outer ends of the links 168 are horizontally pivoted to depending arms 170, 170 fixed on a shaft 171 and the shaft 171 is journaled in brackets 172, 172 secured to the outer surface of the side-frame. An arm 173 (see Figs. 1 and 2) is fixed on the shaft 171 and a spring 174 connects with said arm and to the side-frame, the spring tending to rock the shaft 171 and through the arms 170 and links 168 to retract the bar 166. Adjusting screws 175 screw threaded into the brackets 164 limit the retractive movement of the bar 166. The cleat ejecting pawls 12 are loosely pivoted on the bar 166 with the hub portion of each pawl engaging the inner surface of the respective collars 167 (see Fig. 7) and the pivoted bore in said hub portions being of larger diameter than that of the circular portion of the bar upon which it is mounted, so as to permit a horizontal movement of the outer end of the pawl. Interposed between each pawl and a shoulder 176 on the bar 166 is a coil spring 177 surrounding the bar and exerting its tension to urge the pawl to a plane at right angles to said bar. Thus the tension of the springs 177 tends to urge the outer ends of the pawls towards each other to yieldingly grip the end surfaces of the cleats, as shown in Fig. 7. The free ends of each pawl 12 is bifurcated and the upper furcation is bent inwardly with its inner surface provided with a series of teeth or sufficiently roughened to afford a good grip on the cleats. The lower furcation has a lower straight horizontal edge and an angled cam edge 12$^a$. The lower straight edge normally rests on a roller 178 supported on the bracket 164, and during the ejecting travel of the pawls maintains the pawls at a proper elevation to position the cleat above the bottom board C of the box. As the cleat nears the limit of its travel the straight edges of the pawls pass beyond the rollers 178 allowing the pawls to drop the ejected cleat upon the bottom board C in position for nailing. Upon a retraction of the cleat ejecting mechanism the pawls 12 are pulled free from the nailed cleat, the reengagement of the cam edges 12$^a$ with the rollers 178 restoring the pawls to normal elevation, and a full retraction causing the toothed ends of the pawls to engage the ends of the lowermost cleat of the stack in the cleat hopper preparatory to a subsequent cleat ejecting operation. The means for causing an ejection of the cleats comprises a rock shaft 180 journaled in brackets 181, 181 attached to the inner surface of the side-frame, and having an arm 182 fixed to the shaft and pivotally connected to a depending link 183. The lower end of the link 183 is pivotally connected to an arm 184 fixed on the main rock shaft 143. (See Fig. 5.) A plate 185 is secured to the medial portion of the rock shaft 180 and has two relatively spaced lateral ears 186, 186 carrying adjusting screws 187, 187. An ejector arm 188 is loosely mounted on the shaft 180 and projects downwardly between the ears 186 with the screws 187 engaging its opposite edges to maintain the arm in adjusted position. At timed intervals the lower end of the ejector arm 188 engages the outer edge of the bar 166 of the cleat ejecting mechanism in a cleat ejecting operation. However, as the ejector arm 188 is mounted at a permanent elevation and the bar 166 is carried with the cleat unit to various elevations it will be evident that only when the cleat unit is in its uppermost position, as in Fig. 8, will the bar 166 be in the path of oscillation and that when the cleat unit is at other lower elevations the arm 188 will oscillate idly without engaging said bar. Therefore, the cleats will be ejected only during the machine operation in which the bottom board C is nailed.

*Nailing mechanism.*—The nailing mechanism is of the same general character as that shown and described in the previously mentioned Patent No. 817,509 to E. E. Northrup and comprises the nailing heads 8 depending from the reciprocatory cross-head 9 in vertical alignment with the box ends. The cross-head 9 is slidably retained in aligned guideways in the side-frames and is reciprocated during each machine operation by crank rods 190, 190, the rod adjacent the side-frame 1 being connected to a crank pin on the gear 16 and the rod adjacent the side-frame 2 being connected to a crank pin on an eccentric disk 191 keyed on the outer end of the main drive shaft 15. (See Fig. 2). The nailing heads of the present machine are each constructed to simultaneously drive four nails and each head has a drive head 192 carrying suitable nail drivers 193 slidably engaging in suitable bores in a chuck head 194. (See Fig. 1). The chuck head 194 is dependingly supported by headed studs 196 slidable in the driver head 192 and the driver head is likewise supported by the cross-head 9 by bolts 197 and is yieldingly held separated therefrom by cushion springs 198. Separable chuck jaws 199 aligned with each driver 193 are yieldingly maintained together by springs 200 with their abutting surfaces grooved to form a nail receiving chamber. The nails are discharged from the nail tubes 201 into the nail chambers below the drivers and in a nail driving operation the heads descend until the chuck head 194 contacts the work, a continued movement of the cross-head forcing the drivers 193 through the chuck head to drive the nails into the work. In the driving operation the chuck jaws 199 are spread apart by the nail and serve to support and guide the nail in true alignment with the driver. The cushion springs 198 compensate for fractional differences in the relative heights of the work.

*Nail feed.*—Briefly described, the nail feeding mechanism comprises a nail hopper 202 mounted upon the tops of the side-frames and associated with suitable mechanism for causing the nails to be separately fed into each of the upper sections 203 of the several nail tubes which telescope into the tubes 201. For a detailed illustration and description of the nail feeding mechanism recourse may be had to my previous Patent No. 1,108,594 entitled "Nail picking machines for box-nailing machinery."

*Operation.*—The manufacture of each box utilizes three operations of the machine and during the last of these the completed box is pushed from the table by the box ends of the next box to be formed, therefore, the machine comes to rest after the formation of each box, with a pair of box ends in position to be subsequently operated upon and with the box end feeding mechanism in forward position, as shown in Fig. 3.

With the mechanism in the positions shown, the operator places the board B on the box ends A in abutting engagement with the gages 89 of the slides 79 and then depresses the foot lever 48 or operates the hand lever 25, as desired, to release the brake mechanism and throw in the clutch. During the first portion of the operation the nailing heads 8 start their downward travel, the yoke 81 retracts the slides 79, and the main rock shaft 143 is operated. The rocking of the shaft 143 functions the disks 125 to 128 to rigidly clamp the box ends A and also oscillates the cleat ejector arms 188 but as the feeding bars 166 of the cleat mechanisms are at an elevation below the path of the ejector arms 188 the cleat feeding mechanisms will not be operated.

As the yoke 81 is retracted its transverse web 92 engages the hooked end 110 of the arm 109 and will be arrested at a position short of its full retractive stroke, the spring 101 absorbing the balance of the stroke of the eccentric rod 96, this preventing the feeding of box ends during the next forward stroke of the yoke. The nailing heads 8 nail the board B on the box ends A and during the retracting movement of said heads the table is elevated to its uppermost position. The disks 125 to 128 are separated to release the box ends, and the yoke 81 brought forward. As the yoke 81 is brought forward its supporting shaft 90 is slightly rocked in its eccentric bearings 91 to shorten the forward stroke of the yoke as previously explained, this producing a compound forward movement of the feeding mechanism and positioning the feeding slides 79 at positions rearwardly of their normal positions. At this point the clutch is thrown out and the brake mechanism automatically functioned by the engagement of the cam 31 with the roller 30 and the machine comes to rest.

The operator turns the partially completed box a quarter turn and positions it on the table with the edges of the box ends abuttingly engaging the feed pawls 82 which in this instance act as gages for a correct positioning of the box. He then positions the bottom board C upon the box ends and against the gage plates 89 and again depresses the foot lever 48 as before.

During this second operation of the machine the bars 166 of the cleat feeding mechanisms will be in the path of movement of the ejector arms 188 and will function the cleat feeding mechanisms to eject the bottom cleats from each cleat hopper and position them for attachment to the box, as previously explained. Also during this second operation the position of the shaft 90 of the yoke 81 is normalized so that the slides 79 will again be permitted their full forward stroke. After the nailing heads have attached the cleats D and the board C to the box the final portion of the machine operation again lowers the table to an elevation equal to the first position less the thickness of the board B, which rests on the table when the operator again turns the box a quarter turn prior to the final operation in formation of the box.

In the third operation for attaching the board E, the machine operates in the same manner as it does in the first step, excepting that upon the retraction of the feeding yoke 81 the arm 109 is moved backward sufficiently to permit a full retractive stroke of the slides 79, to the position indicated in dotted lines in Fig. 3, so that the feed pawls 82 will engage and feed forward into the machine a pair of box ends A for a new box.

While the form of mechanism herein shown and described, is admirably adapted to fulfill the objects primarily stated, it is to be understood that it is not intended to confine the invention to the one form of embodiment herein disclosed, for it is susceptible of embodiment in various forms, all coming within the scope of the claims which follow.

I claim:

1. A box making machine combining a table, nailing devices above the table, means feeding vertically disposed box ends onto the table in cooperative alignment with the nailing devices, and means functioning to automatically feed cleats between and in alignment with the edges of the respective box ends and respective nailing devices.

2. A box making machine combining a table, nailing devices above the table, means functioning to position the table successively at different elevations, means feeding box ends onto the table in cooperative alignment with the nailing devices, and means operable only when the table is in one of its positions and functioning to automatically feed cleats between and in alignment with the respective box ends and nailing devices.

3. A box making machine combining a table, nailing devices above the table, means functioning to position the table successively at different elevations, means feeding box ends onto the table in cooperative alignment with the nailing devices when the table is moved to one of its positions, and means operable only when the table is moved to another of its positions and functioning to automatically feed cleats between and in alignment with the respective box ends and nailing devices.

4. A box making machine combining a table, nailing devices above the table, means operated during each machine operation and functioning only at every third operation to feed box ends onto the table, other means functioning during the intermediate machine operations to prevent a feeding of box ends, and means functioning only during one of said intermediate machine operations to automatically position cleats between and in alignment with the respective box ends and nailing devices.

5. A box making machine combining a table, nailing devices above the table, means supporting a supply of box ends, a reciprocatory feeding device adapted to singly engage the box ends when fully retracted and to feed the engaged box ends onto the table during a forward stroke, means permitting a full retractive stroke of the feeding device only during every third machine operation and functioning to arrest said device short of its full retractive stroke during the intermediate machine operations, and independent means actuated by a moving part of the mechanism for varying the forward stroke of the feeding device during one of the intermediate machine operations.

6. A box making machine combining a table, nailing devices above the table, means supporting a supply of box ends, a reciprocating feeding device adapted to singly engage the box ends when fully retracted and to feed the engaged box ends onto the table during a forward stroke, means permitting a full retractive stroke of the feeding device only during every third machine operation and functioning to arrest said device short of its full retractive stroke during the intermediate machine operations, independent means for varying the forward stroke of the feeding device during one of the intermediate machine operations, and means automatically stopping the machine at the end of each forward stroke of the feeding device, the forward end of the feed device operating as a gage to facilitate aligning the parts of the box for a nailing operation while the feed device is motionless.

7. In a machine for making a box in three machine operations, the combination of a table, nailing devices above the table, a feeding device operated during each machine operation and functioning to feed box ends onto the table only during one of the three operations, means for varying the operation of the feeding device during the others of the three operations to prevent a feeding of box ends, means automatically functioning only during one of said other operations to position cleats between and in alignment with the respective nailing devices and box ends, and means for operating the nailing devices during each machine operation.

8. In a machine for making a box having rectangular box ends, a table, nailing devices above the table, feeding means vertically positioning the box ends upon the table in parallel spaced relation, means holding the box ends against movement during a nailing operation and subsequently releasable to permit a turning of the box ends to positions to successively support a side board, a bottom board, and a second side board, means for operating the nailing devices in a fixed zone to successively nail the boards to the respective edges of the box ends, means positioning the table to a different elevation during each nailing operation to bring the surfaces of the boards successively within the zone of operation of the nailing devices, and means carried by the table and adapted automatically to position transverse cleats upon said bottom boards, the nailing devices functioning to simultaneously nail the bottom board and cleats to the box ends.

9. In a machine for making a box having rectangular box ends and transverse bottom cleats, a table, nailing devices above the table, feeding means vertically positioning the box ends upon the table in parallel spaced relation, means holding the box ends against movement during a nailing operation and subsequently releasable to permit a turning of the box ends to positions to successively support a side board, a bottom board, and a second side board, means for automatically positioning the transverse cleats upon the bottom board in alignment with the box ends, means for operating the nailing devices in a fixed zone to successively nail the boards to the respective edges of the box ends with the cleats secured in position by the nails which secure the bottom board to the box ends, and means positioning the table to a different elevation during each nailing operation to bring the nailing surfaces successively to a uniform plane within the zone of operation of the nailing devices.

10. In a machine for making a box in three machine operations, the combination of a table, means functioning during one of the three operations for feeding box ends onto the table in parallel spaced relation to support a side board manually placed thereon, nailing devices above the table functioning during one machine operation to nail said side board to the box ends, means holding the box against movement during a nailing operation and subsequently releasable to permit a manual turning of the partially completed box to a position to support a bottom board manually placed upon the box ends, means automatically functioning to position transverse cleats upon the bottom board in alignment with the respective box ends, the nailing devices functioning during a second machine operation to simultaneously nail the cleats and bottom board to the box ends, the holding means functioning during the second nailing operation and then releasing the box ends for a second manual turning of the partially completed box upon the table to a position to support a second side board manually placed thereon, and the nailing devices functioning during a third machine operation to nail said second side board to the box ends.

Signed at San Bernardino, California, this 9th day of July, 1921.

CHARLES G. LUNDHOLM.

Witnesses:
L. C. LINFESTY,
S. J. JAEGER.